United States Patent [19] [11] 3,762,371
Quayle et al. [45] Oct. 2, 1973

[54] METHODS AND APPARATUS FOR THE DETECTION OF MASTITIS IN MILK ANIMALS

[75] Inventors: Joshua Creer Quayle, Stockton; Graham Roland Greatrix, Seaton Carew, both of England

[73] Assignee: National Research Development Corporation, London, England

[22] Filed: June 23, 1972

[21] Appl. No.: 265,496

Related U.S. Application Data

[62] Division of Ser. No. 50,711, June 29, 1970, Pat. No. 3,695,230.

[30] Foreign Application Priority Data
June 30, 1969 Great Britain.................. 33,032/69

[52] U.S. Cl................................ 119/14.14, 324/30
[51] Int. Cl. ........................................... A01j 07/00
[58] Field of Search...................... 119/14.14, 14.15; 73/194; 324/30

[56] References Cited
UNITED STATES PATENTS
2,898,549  8/1959  Miller ................................... 324/30
3,374,672  3/1968  Horne ................................... 73/194
3,474,330  10/1969  Dauphinee ........................... 324/30

Primary Examiner—Hugh R. Chamblee
Attorney—Cushman, Darby & Cushman

[57] ABSTRACT

Apparatus and methods for comparing the conductivities of liquid streams by induction are described. Such apparatus and methods have particular application in detecting mastitis in milk animals where differences in the conductivities of milk streams from different teats of the same animal may indicate the presence of mastitis. The apparatus described is specially suited for use with milking machinery in that it is economical to manufacture and is easy to keep clean. In one embodiment four coils are provided one for each of four conductivity measuring cells in a hemispherical chamber in the claw piece of milking apparatus.

10 Claims, 4 Drawing Figures

PATENTED OCT 2 1973 3,762,371

METHODS AND APPARATUS FOR THE DETECTION OF MASTITIS IN MILK ANIMALS

This is a division of application Ser. No. 50,711 filed June 29, 1970, now U. S. Pat. No. 3,695,230. The present invention relates to the comparison of the resistivities of liquids, and particularly the detection by such comparison of mastitis in cows at a stage early enough to prevent the infection of other cows, lasting damage to the udder, and reduction in milk yield.

It has previously been proposed in U.S. Pat. application No. 41938/68 to detect mastitis using apparatus which during milking compares the resistance of milk from different quarters of a cow's udder, using an electrical bridge. If the milk stream from one quarter has a different conductivity from other streams, mastitis may be present. Apparatus for measuring and comparing the conductivities of liquids, particularly milk, using electrodes in contact with the liquid, is described and claimed in application No. 50711 filed June, 29th 1970. now U.S. Pat. No. 3,695,230.

Comparing resistance presents several problems. For example, inaccurate results will be obtained if ineffective cleansing leaves coatings of fat or milk stone on the electrodes of conductivity cells forming part of the comparison apparatus. Uniting the electrodes to the surrounding moulding without leaving crevices in which bacteria and solid deposits can lodge is difficult and tends to make conductivity cells with electrodes which contact the milk fairly expensive.

According to a first aspect of the present invention there is provided a method of detecting mastitis in milk animals, including obtaining electrical signals by induction which are dependent on the resistivity of samples of milk from at least two different teats of the animal, and comparing the signals to detect any differences in the resistivites of the samples.

According to a second aspect of the present invention there is provided apparatus for comparing the resistivites of liquid samples, particularly milk samples, including at least two inductive sensing means, each sensitive by induction to the resistivity of a different liquid sample, and differential measuring means coupled to the sensing means for detecting any differences in the resistivities of the samples.

The disadvantages in apparatus for detecting mastitis by comparing resistance with electrodes in contact with milk need not occur in the above apparatus since the sensing means need not have such electrodes.

Each sensing means may be a coil of wire which is adapted to be positioned adjacent to a stream of milk from one quarter of the udder. Currents induced in the milk by currents in such a coil effect the impedance of the coil. Hence the resistive and inductive components of the impedance of the coil depend on the conductivity of the milk.

The differential sensing means is prefereably a four-arm electrical bridge, and preferably four sensing means, one for each quarter, are provided, one connected in each arm of the bridge. If the bridge is balanced before milk is tested, any imbalance during testing may be due to mastitis infection. The bridge may compare the impedance, or the resistive or inductive components of the impedance, of the coils in order to compare conductivities of milk streams.

If the four sensing means are coils they can conveniently be built into a claw piece; that is a junction member at which four inlet tubes, one for each teat of the udder, are joined to a single tube from a milking machine. The claw piece is then divided into four interconnecting cells each with one of the inlet tubes so positioned that milk entering the cell substantially swirls round the horizontal periphery of the cell forcing foam to the top of the cell. In each cell the coil is then located at or near the bottom of the cell away from the foam which would otherwise affect the accuracy of measurement.

The claw piece may have a generally hemispherical chamber divided by four radial barriers into the four cells. The barriers may be joined at a central boss with a common outlet at the centre of revolution of the hemisphere. The coils are conveniently located under the plane surface of the hemisphere but this surface may itself be curved upwards towards its periphery.

The boss may then have a concave surface facing the common outlet so that during purging when the claw piece is inverted, that is with its spherical surface underneath, a purging liquid pumped into the claw piece through the outlet impinges on the concave surface and sprays on to the surfaces covering the coils.

Certain embodiments of the invention will now be described, by way of example, with reference to the accompanying drawings, in which.

Figure 1:
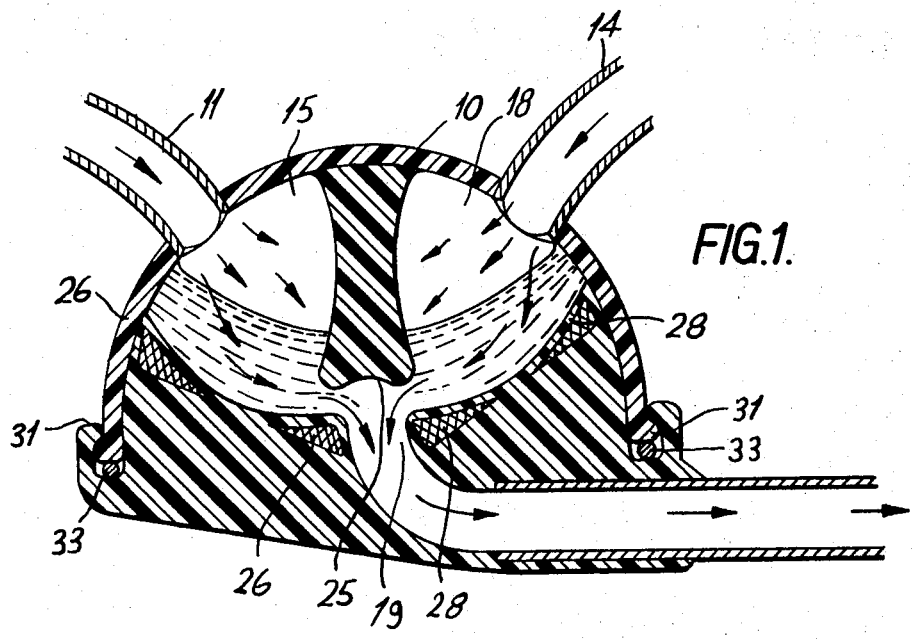
FIG. 1 is a vertical cross-section of a claw piece used in an embodiment of the second aspect of the invention.
Figure 2:
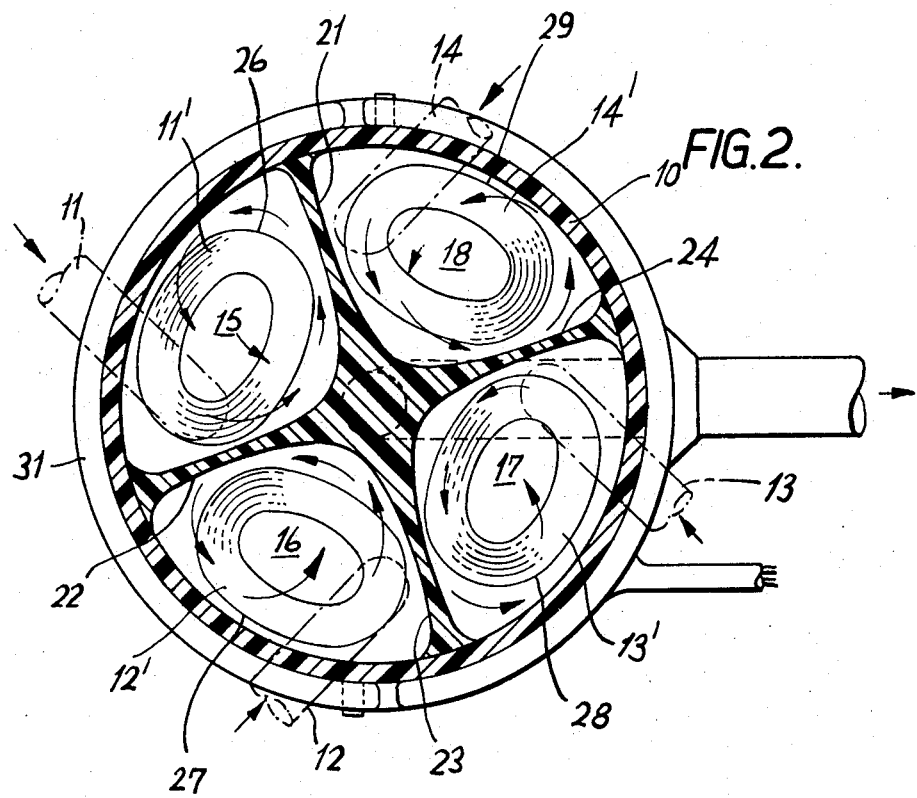
FIG. 2 is a horizontal cross-section of the claw piece of FIG. 1.

In FIGS. 1 and 2 a claw piece 10 is shown which can be incoporated in milking apparatus for cows, with the object of detecting mastitis. The claw piece 10 is of generally hemispherical shape with four inlet pipes, 11, 12, 13 and 14. These pipes terminate at one end in teat cups (not shown) and at the other end in four chambers, 15 to 18, of the claw piece. At the centre of the bottom of the claw piece there is an exit pipe 19 which is connected to a milking machine (not shown). The four cells, 15 to 18, are divided by radial barriers 21 to 24, and the barriers are united at a central boss 25 above the end of exit pipe 19.

Four coils of wire, 26 to 29, are embedded in the bottoms of the chambers 15 to 18, respectively.

A bayonet catch 31 is provided uniting the top of the claw piece 32 with its base 33.

Figure 3:
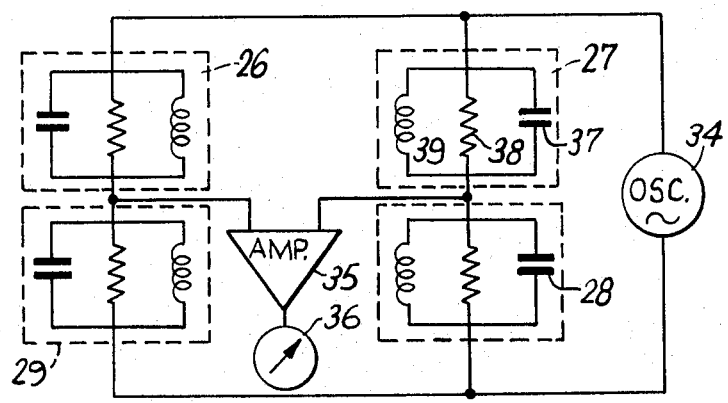
FIG. 3 is a block diagram of the above mentioned embodiment, including equivalent circuits incorporated in part of the claw pieces of FIGS. 1 and 2.

The coils 26 to 29 are connected in the bridge circuit of FIG. 3. The coil 27 is shown as an equivalent inductance 39, an equivalent resistance 38, and an equivalent capacitance 37. The coils 26, 28 and 29 are shown in a similar way. The bridge has four arms comprising the four coils, an oscillator 34 connected to one pair of opposite corners of the bridge, and an amplifier 35 coupled to a null detector 36 connected to the other opposite corners of the bridge.

To minimise capacitive coupling between adjacent coils and its effects on the out-of-balance signal, the windings of the coils are so arranged that the outermost turns are at the ends of the windings connected to the oscillator. Then capacitance between adjacent coils 26, 27 and 28, 29 has no effect since the adjacent turns are at the same potential. Capacitance between the coils 26 and 29, and 27 and 28, are merely shunts across the bridge and do not affect the balance.

To minimise inductive coupling, between adjacent coils, the flow of current is arranged so that all four are magnetised in the same sense.

When milk from a healthy cow enters the claw piece the impedance of the four coils are equal and the bridge is balanced. The milk affects the impedance of the coils in three ways. Firstly, the milk acts as a resistive secondary coil and currents are induced to flow into it. The consequent loss of energy is reflected in a diminution of the effective parallel resistance of the coil; secondly, the effective inductance of the coil is reduced; and thirdly, the self-capacitance of the coil is increased by the presence of the milk.

When a cow becomes in infected with mastitis the conductivity of her milk increases. Hence, if one-quarter of a cow's udder is infected the milk flowing in one of the cells of the claw piece 10 will have a different conductivity from the milk flowing in the other cells. The change in conductivity will alter the equivalent series resistance of the coil associated with that cell and also its inductance and capacitance.

Provided the coils are constructed in known ways to make the effects of permittivity small, the changes in the effective inductance are indicative of changes in the resistance of the milk. Thus the resistive component or the inductive component of the impedances of the coils may be compared using suitable known bridges and if necessary additional known circuits. Instead, as in FIG. 3, the impedance of the coils may be compared using a known bridge.

The accuracy of measurement using the bridge is impaired if the milk adjacent to the coils contains bubbles of form. This effect is minimised by positioning the inlet tubes 11 to 14, shown superimposed on FIG. 2, so that as the milk is drawn into the claw piece it swirls round the cells 15 to 18 in the directions indicated by arrows 11′ to 14′. The swirling action throws the foam towards the top of the claw piece so that milk adjacent to the coils is foam-free. The swirl of the milk also helps to spread the milk over the interior surface of the claw piece just above the coils, and therefore minimises "channelling"; that is the formation of flow patterns which would leave portions of this surface thinly covered with milk.

Figure 4:
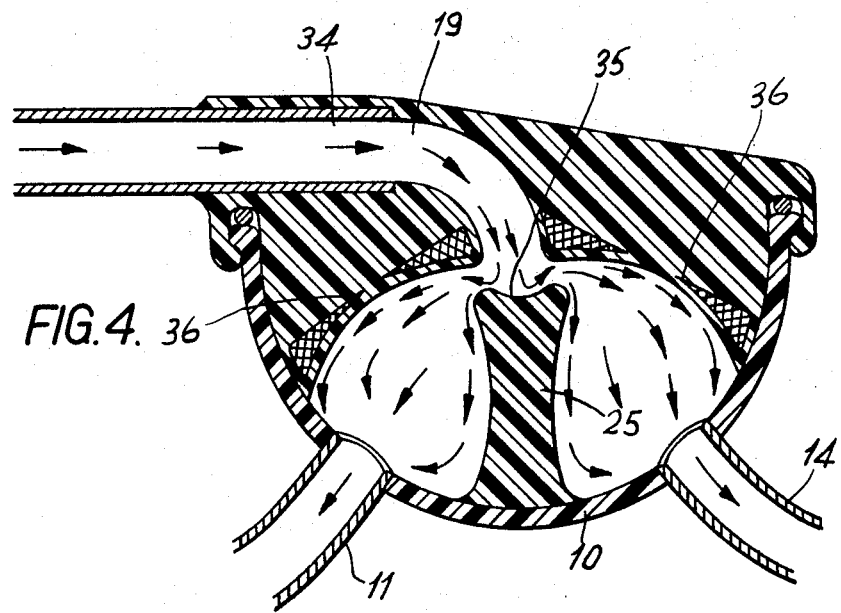
FIG. 4 shows the claw piece of FIG. 1 in the purging position.

The claw piece 10 has been devised so that purging is particularly effective. The claw piece is inverted, as shown in FIG. 4, for purging with the teat cups hanging downwards on their pipes. A detergent germicide such as Sulphamic Acid in hot water is passed through the inlet pipe 19 in the direction of the arrows 34 where it impinges on a concave surface 35 of the central boss 25. The germicidal detergent is thrown in the form of a spray on to the surfaces 36 covering the coils and then passes out of the inlet pipes 11 and 13. This process is followed by the prolonged circulation of hot water following the same path as the detergent.

We claim:

1. A method of detecting mastitis in milk animals, including obtaining electrical signals by induction which are dependent on the resistivity of samples of milk from at least two different teats of the animal, and comparing the signals to detect any differences in the resistivities of the samples.

2. Apparatus for comparing the resistivities of liquid samples, particularly milk samples from at least two different teats of an animal being milked, including at least two inductive sensing means, each sensitive by induction to the resistivity of a different liquid sample, and differential measuring means coupled to the sensing means for detecting any differences in the resistitivies of the samples.

3. Apparatus according to claim 2 wherein each sensing means includes a coiled conductor adapted to be positioned adjacent to a different liquid stream.

4. Apparatus according to claim 3 wherein each coiled conductor is associated with a liquid channel particular thereto and is positioned adjacent to the associated channel.

5. Apparatus according to claim 2 wherein the differential sensing means is a four-arm electrical bridge, and four sensing means, one for each quarter, are provided, one connected in each arm of the bridge.

6. Apparatus according to claim 5 including a junction member having four cells, each with an inlet so positioned that milk entering the cell substantially swirls round the periphery of the cell forcing foam away from one interior surface of the cell, and the apparatus having one coiled conductor for each cell positioned adjacent to the said surface.

7. Apparatus according to claim 6 wherein the junction member has a generally hemispherical chamber divided by four radial barriers into four cells, and four coiled conductors are located within that wall of the chamber forming the plane surface of the hemisphere, one conductor adjacent to each cell.

8. Apparatus according to claim 7 wherein the cells have a common outlet at the centre of revolution of the hemisphere, and each cell has an inlet in its spherical surface.

9. Apparatus according to claim 8 wherein the barriers are joined at central boss which has a concave surface facing the common outlet.

10. Apparatus according to claim 9 wherein the nominally plane surface of the hemisphere is concave.

* * * * *